(12) United States Patent
Dries et al.

(10) Patent No.: US 6,846,463 B1
(45) Date of Patent: Jan. 25, 2005

(54) GAS-SOLID SEPARATION PROCESS

(75) Inventors: Hubertus Wilhelmus Albertus Dries, Amsterdam (NL); Charles Rotchford Galloway, Amsterdam (NL)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 09/914,062

(22) PCT Filed: Feb. 22, 2000

(86) PCT No.: PCT/EP00/01467
§ 371 (c)(1),
(2), (4) Date: Aug. 22, 2001

(87) PCT Pub. No.: WO00/50538
PCT Pub. Date: Aug. 31, 2000

Related U.S. Application Data

(60) Provisional application No. 60/154,119, filed on Sep. 15, 1999.

(30) Foreign Application Priority Data

Feb. 23, 1999 (EP) .............................. 99301285
Sep. 15, 1999 (EP) .............................. 99307316

(51) Int. Cl.[7] .......................... F27B 15/08; B01D 45/12
(52) U.S. Cl. .......................................... 422/147; 55/349
(58) Field of Search ................................ 422/139–147, 422/232; 55/345, 474, 459.1, 349; 46/372

(56) References Cited

U.S. PATENT DOCUMENTS

| | | | | |
|---|---|---|---|---|
| 4,313,910 A | * | 2/1982 | Dries et al. ................ | 422/147 |
| 4,380,105 A | * | 4/1983 | MacLean et al. ......... | 29/890.14 |
| 4,623,446 A | | 11/1986 | Haddad et al. | |
| 4,678,642 A | * | 7/1987 | Lee ............................ | 422/144 |
| 4,692,311 A | * | 9/1987 | Parker et al. .............. | 422/144 |
| 4,714,541 A | * | 12/1987 | Buyan et al. .............. | 208/161 |
| 4,973,452 A | | 11/1990 | Own | |
| 4,997,800 A | * | 3/1991 | Child ......................... | 502/42 |
| 5,055,177 A | * | 10/1991 | Haddad et al. ............ | 208/161 |
| 5,112,576 A | * | 5/1992 | Kruse ......................... | 422/144 |
| 5,129,930 A | * | 7/1992 | Gauthier et al. ........... | 55/394 |
| 5,248,411 A | * | 9/1993 | Chan .......................... | 208/161 |
| 5,279,727 A | * | 1/1994 | Helstrom et al. .......... | 208/161 |
| 5,869,008 A | * | 2/1999 | Dewitz ....................... | 422/144 |
| 5,917,065 A | * | 6/1999 | Halldin et al. ............. | 55/459.1 |
| 5,938,803 A | * | 8/1999 | Dries ......................... | 55/337 |

* cited by examiner

*Primary Examiner*—Kiley Stoner
*Assistant Examiner*—Kevin McHenry
(74) *Attorney, Agent, or Firm*—Charles W. Stewart

(57) ABSTRACT

Apparatus for separating solid particles from a suspension of solid particles and gas, wherein the apparatus comprises: (i) a vertical primary cyclone vessel having a tubular housing comprising of a tubular wall section provided with a tangentially arranged inlet for receiving the suspension, and a cover which closes the upper end of the tubular wall section; wherein the cover is provided with an axial circular opening which opening serves as a gas inlet opening of a gas outlet conduit; (ii) one or more secondary gas-solids cyclone separators which are fluidly connected with the gas outlet conduit of the primary cyclone.

12 Claims, 5 Drawing Sheets

GAS-SOLID SEPARATION PROCESS

This application claims the benefit of U.S. Provisional Patent Application Ser. No. 60/154,119 filed 15 Sep. 1999, which is incorporated herein by reference in its entirety.

FIELD OF THE INVENTION

The invention is directed to an improved separation apparatus, wherein particles can be efficiently separated from a gas-particles mixture. The invention is also directed to the use of such an apparatus in a fluid catalytic cracking process.

BACKGROUND OF THE INVENTION

The field of fluid catalytic cracking (FCC) has undergone significant development improvements due primarily to advances in catalyst technology and product distribution obtained therefrom. With the advent of high activity catalysts and particularly crystalline zeolite cracking catalysts, new areas of operating technology have been encountered requiring even further refinements in processing techniques to take advantage of the high catalyst activity, selectivity and operating sensitivity. Of particular concern in this field has been the development of methods and systems for separating the hydrocarbon product from the catalyst particles, particularly from a high activity crystalline zeolite cracking catalysts, under more efficient separating conditions so as to reduce the overcracking of conversion products and promote the recovery of desired products of an FCC operation. U.S. Pat. No. 4,588,558, U.S. Pat. No. 5,376,339, EP-A-309244, U.S. Pat. No. 5,055,177 and U.S. Pat. No. 4,946,656 all describe developments concerned with the rapid separation and recovery of entrained catalyst particles from the hydrocarbon products. The rapid separation is achieved in that the catalyst are separated from the reactor riser effluent in a first cyclone separator, the primary cyclone, of which gas outlet conduit is in fluid connection with a secondary cyclone. This cyclone line up in FCC reactors is also referred to as close-coupled cyclone separation provided that the primary and secondary cyclones are contained in one larger vessel. This coupling of primary and secondary cyclones minimises the residence time in which the hydrocarbon product is in contact with the catalyst after it leaves the reactor riser, which limits undesirable aftercracking.

Both in the FCC reactor, as discussed above, and in the FCC regenerator such series of primary and secondary cyclones exist. EP-A-309244 describes an example wherein coupled cyclone separators are both used in the reactor as well as the regenerator vessel. Typically more than one of these series of cyclones exist in parallel. Examples of other processes in which a primary and secondary cyclone arrangements are used are the Methyl tert-butyl ether (MTBE)-fluidized bed dehydrogenation process and in the acrylonitrile process.

There is an on-going effort to improve the separation efficiency of cyclone separation apparatuses.

One known method of improving the separation efficiency of a primary cyclone apparatus is achieved by decreasing the cross-sectional area of either the gas inlet or the gas outlet opening and hence increasing the local gas velocity. Although the separation efficiency of the primary cyclone shows an improvement, the overall efficiency of the primary and secondary cyclone separators is not significantly improved.

One of the objects of the present invention is therefore to provide an apparatus, wherein particles can be efficiently separated from a gas-particles mixture, which has an improved overall separation efficiency.

The invention is also directed to a combined separation and stripping process, wherein a mixture of fluid catalytic cracking catalyst is separated from a catalyst containing gaseous hydrocarbon effluent of a fluid catalytic cracking (FCC) reactor zone and wherein any hydrocarbons are stripped from the separated catalyst particles in a fluidized bed zone to which a gaseous stripping medium is supplied to.

Such a combined FCC separation/stripping process is described in WO-A-9742275. This publication describes the separation of catalyst particles from a gaseous stream leaving a reactor riser of a fluid catalytic cracking (FCC) process. The separation is performed by making use of a primary cyclone apparatus located in a reactor vessel, in which primary cyclone the gas-solids stream enters tangentially into a vertical tubular cyclone housing. The solids are discharged downwards to a stripping zone located at the lower end of the reactor vessel. A partly cleaned gas stream and part of the stripping gas is discharged upwards through a vertical gas-outlet conduit, which gas-outlet conduit protrudes the cyclone tubular housing from above. The solids still present in the partly cleaned gas obtained are subsequently separated in a secondary cyclone. The lower open end of the tubular primary cyclone housing projects downwards into a fluidized-bed zone present in the lower part of earlier mentioned reactor vessel. Stripping gas is supplied to the main fluidized bed zone. Because the tubular housing of the primary cyclone separator is smaller than the reactor vessel only a part of the stripping gas will enter the tubular primary cyclone housing from below.

U.S. Pat. No. 4,692,311 describes a combined process for separating and stripping FCC catalyst in which all of the stripping gas is discharged through the gas outlet of the primary cyclone separator. This is achieved by using a cyclone having a tubular housing and a single stripping zone located in the lower portion of said tubular housing. In this manner all of the stripping gas will have to leave the primary cyclone via its gas-outlet. Although this process may look promising regarding the simplicity of the design no large scale working examples have been realised up till now. This is because the separation efficiency is poor when a large flow of stripping gas has to pass through the tubular housing of the cyclone. A similar apparatus as described in U.S. Pat. No. 4,692,311 is described in U.S. Pat. No. 5,112,576.

Cyclone separators having a vertical tubular housing and an gas-outlet conduit having a gas-inlet opening located at about the level of an elevated cyclone roof are described Chemie Ingenieur Technik (70) 6 1 98, pages 705–708.

A next object of the invention is to provide an improved process for the combined separation and stripping of a mixture of fluid catalytic cracking catalyst in a fluid catalytic cracking process, in which the separation efficiency of the catalyst is higher.

These objects and other objects, apparent when reading the description, are achieved with the following apparatus.

SUMMARY OF THE INVENTION

Apparatus for separating solid particles from a suspension of solid particles and vapour, wherein the apparatus comprises:
(i) a vertical primary cyclone vessel having a tubular housing comprising of a tubular wall section provided with a tangentially arranged inlet for receiving the particles and vapour, and which tubular wall section is open at its lower end and closed at its upper end by means of a cover provided with an opening, wherein the opening is fluidly connected to a gas outlet conduit, which conduit has a gas inlet opening located at the same level as the opening in the cover;

(ii) one or more secondary gas-solids separator means which are fluidly connected with the gas outlet conduit of the primary cyclone.

Applicants have now found that the combined primary and secondary cyclone separation means of the apparatus of the invention achieve a far better separation efficiency that the state of the art separation devices comprising conventional primary and secondary cyclone separators. With conventional cyclone separators is here meant having a design in which the gas outlet conduit significantly protrudes the cyclone housing from above. With significantly protruding the cyclone housing from above is especially meant that the protrusion equals between 0.4 and 1.2 times the height of the tangentially arranged feed-inlet opening. A typical conventional cyclone is exemplified in Fig. 17-36 of Perry's Chemical Engineers' handbook, McGraw Hill, 7th ed., 1997.

The invention is also directed to a fluidized catalytic cracking process making use of said apparatus. Moreover in a specific FCC application wherein stripping and primary separation are combined in one tubular vessel a combination of good separation and stripping efficiency can be achieved. Such an apparatus requires less additional means to discharge stripping gas and/or can be used with a higher stripping gas loading while the separation efficiency remains within the desired range. This was not possible with the above described prior art apparatuses.

With respect to the disclosed efficiency of the cyclone separators disclosed in the above cited article in Chemie Ingenieur Technik it is surprising that the combination of a primary cyclone and a secondary cyclone separation means of the claimed apparatus show such a high separation efficiency when a suspension containing relatively a high content of solids is fed to the primary cyclone. This is especially surprising in view of the fact that it is not always obvious which measures will positively influence the overall separation efficiency of a coupled cyclone separation line up. For example when improving the separation efficiency of the primary cyclone by means of a known technical measure, increasing the gas inlet and/or outlet velocities in the primary cyclone separator, the overall separation efficiency of primary and secondary cyclone is not improved. Applicants have now found that this overall efficiency can be significantly improved when the apparatus according the invention is used. In one example the particle content was reduced ten fold in the gas stream leaving the secondary separation means.

The invention shall be described in more detail below, including some preferred embodiments.

DETAILED DESCRIPTION OF THE INVENTION

The invention is in particular directed to any one of the two embodiments described below.

The first preferred embodiment is an apparatus for separating solid particles from a suspension of solid particles and gas, wherein the apparatus comprises:

(i) a vertical primary cyclone vessel having a tubular housing comprising of a tubular wall section provided with a tangentially arranged inlet for receiving the suspension, a dipleg at the lower end of the tubular wall section, fluidly connected to the tubular wall section by means of a frusto conical wall section, and a cover which closes the upper end of the tubular wall section, wherein the cover is provided with an axial circular opening which opening serves as a gas inlet opening of a gas outlet conduit;

(ii) one or more secondary gas-solids cyclone separators which are fluidly connected with the gas outlet conduit of the primary cyclone.

The second preferred embodiment is an apparatus for combined separation and stripping of a suspension of catalyst particles and vapour in a fluidized catalytic cracking process, wherein the apparatus includes:

(i) a vertical primary cyclone vessel, which primary cyclone is provided with a tangentially arranged inlet for receiving the suspension of catalyst particles and vapour, which primary cyclone has a tubular side wall and is open at its lower end and closed at its upper end by means of a cover provided with an opening, wherein the outlet opening is fluidly connected to a gas outlet conduit, which conduit has a gas inlet opening located at about the same level as the opening in the cover;

(ii) a stripping zone which zone is provided with means to supply stripping gas, so arranged that in use a fluidized bed is present, located such that part or all of the stripping gas leaving the stripping zone in an upward direction enters the lower end of the primary cyclone; and (iii) one or more secondary gas-solids separators, preferably secondary cyclone separators, which are in fluid connection with the gas outlet conduit of the primary cyclone.

The apparatus according to the invention and in particular the first preferred embodiment as described here above can find use in any process in which solid particles are to be separated from a suspension of said solid particles and a gas. Examples of such process are the afore-mentioned MTBE-fluidized bed dehydrogenation process, the acrylonitrile process and fluid catalytic cracking (FCC) process. Examples of such a fluid catalytic cracking process are described in Catalytic Cracking of Heavy Petroleum Fractions, Daniel DeCroocq, Institut Francais du Petrole, 1984 (ISBN 2-7108-455-7), pages 100–114.

In a catalytic cracking process a hydrocarbon feed is contacted with a catalyst at elevated temperatures for a short period. Normally the catalyst and the hydrocarbon feed flow co-currently through a tube-like reactor. These pipe-like reactors are also referred to as riser reactors because in most cases the reactants flow in an upward motion. Although the term riser is used in this description it does not mean that the invention is limited to embodiments comprising risers through which the reactants flow in an upward direction. Contact times in the riser reactor are generally in the range of between 0.5 and 5 seconds. In the reactor riser hydrocarbons having generally a normal boiling point above 350° C. are converted to lighter products, for example gasoline being one of the major products of an FCC process. Hydrocarbons and coke will deposit on the catalyst particles. By stripping the separated catalysts with a suitable stripping medium a major portion of the deposited hydrocarbons will be separated from the catalyst. The gaseous mixture of hydrocarbons and stripping medium obtained in such a stripping zone is suitably discharged from the FCC reactor together with the FCC product. The coke is subsequently separated from the thus stripped catalyst by, optionally partial, combustion in a regenerator vessel. The regenerated catalyst, having an elevated temperature is returned to the bottom of the reactor riser.

In an FCC process solid catalyst particles can be separated from gasses in both the reactor as well as the regenerator making use of the apparatus according to the invention. On the reactor side catalyst are to be separated from the hydrocarbon product gasses. It is important that such a separation can be performed in an efficient manner making use of such coupled primary and secondary cyclones of the apparatus according to the invention and in particular according to the two preferred embodiments as described here above. Any catalyst solids which are not separated will have to be separated further downstream, for example by making use of filters or in a so-called third stage separator. By improving the separation smaller filters can be used and/or less catalyst fines will end up in the FCC product streams. On the regenerator side catalyst particles will have to be separated from the flue gas leaving the regenerator. The amount of particles in the flue gas should be low for environmental reasons and to protect downstream equipment, like for example expansion turbines. Preferably the first preferred embodiment as described here above is used on the regenerator side.

BRIEF DESCRIPTION OF THE DRAWINGS

FIG. 3 illustrates an apparatus according to the invention having an external fluid catalytic cracking reactor riser and an external secondary cyclone.

FIG. 4 is a variation of the apparatus of FIG. 3.

FIG. 5 represents an apparatus in which the downstream part of the reactor riser, the primary separation and secondary cyclones and the stripping zone are contained within one vessel.

DETAILED DESCRIPTION OF THE DRAWINGS

Figure 1:
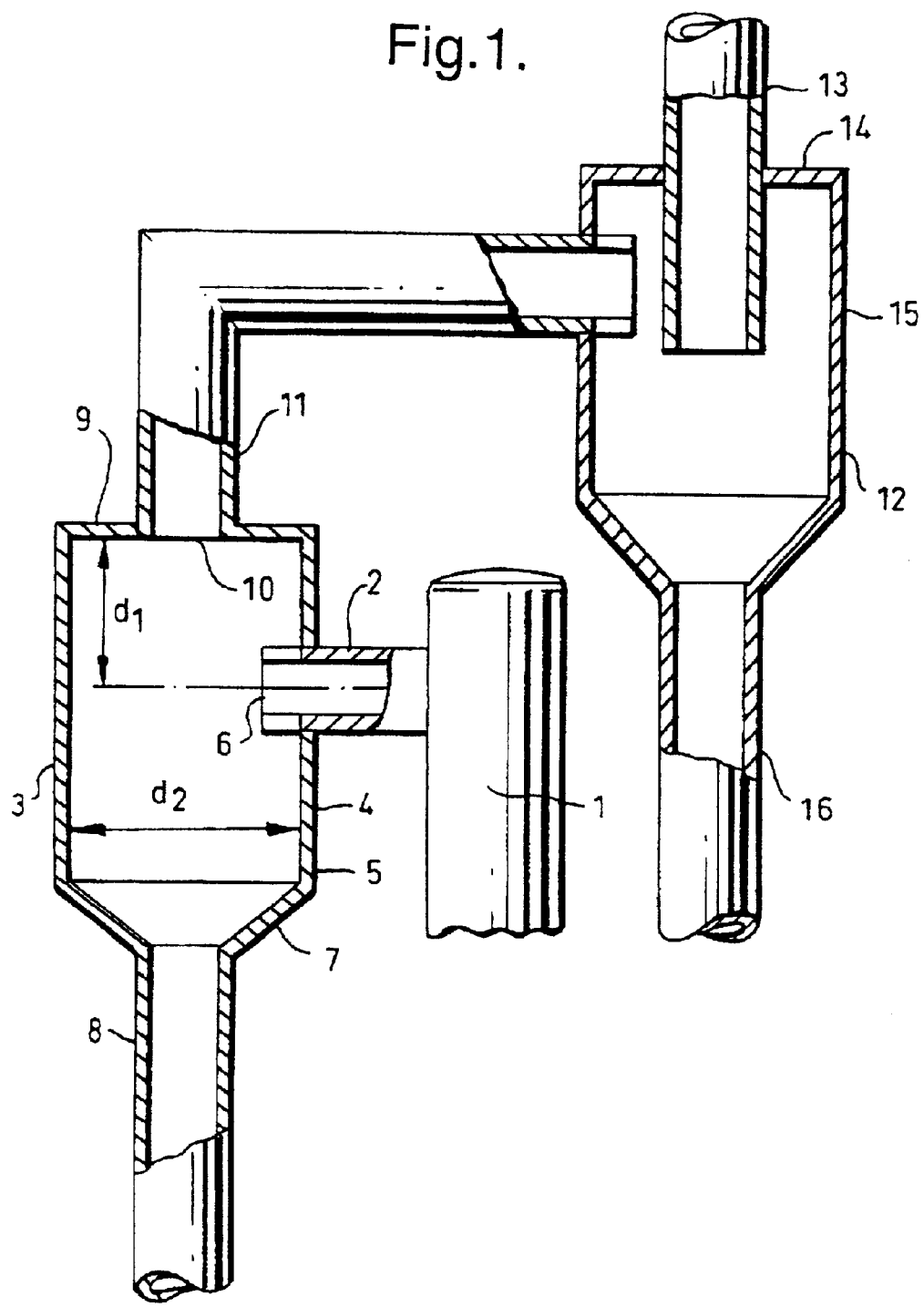
FIG. 1 illustrates a partly cross-sectional presentation of a close-coupled cyclone apparatus in an FCC reactor configuration according to first preferred embodiment of the invention.

FIG. 1 represent a preferred embodiment of the apparatus according to the invention. In the Figure a reactor riser (1) of a fluidized catalytic cracking process is shown which is fluidly connected via conduit (2) to a primary cyclone (3). In the Figure only one primary cyclone separator is shown for clarity reasons. Typically more than one, suitably two or three, primary cyclone separators (3) will be in fluid communication with the down stream end of a reactor riser (1). The primary cyclone (3) has a tubular housing (4) consisting of a tubular wall section (5) provided with a tangentially arranged inlet (6) for receiving the suspension of catalyst particles and hydrocarbon vapour which leave the reactor riser (1). The inlet can have for example a circular or rectangular form. The lower end of the tubular wall section (5) is fluidly connected by means of a frusto conical wall section (7) to a dipleg (8). Through dipleg (8) most of the catalyst particles will be discharged downwards. The upper end of the tubular wall section (5) is provided with a, suitably flat, cover (9). Cover (9) is provided with an axial circular opening (10) which opening serves as a gas inlet opening of a gas outlet conduit (11). The beginning of the gas outlet conduit (11) is suitably arranged perpendicular relative to the cover (9) and has the same axis as the axis of tubular housing (4). The diameter of the gas inlet opening of the gas outlet conduit (11) is preferably between 0.3 and 0.6 times the diameter of the tubular wall section (5) of the cyclone housing (4). Essential to the present invention is that the gas outlet conduit (11) does not, or not significantly, protrudes the cyclone housing from above. In a possible embodiment of the present invention a small protrusion is allowed. Preferably such protrusion is smaller than 0.5 times the diameter of the gas inlet opening or axial circular opening (10) in the cover (9) of the cyclone. The gas outlet conduit (11) is in fluid communication with a secondary gas-solids separator (12). In the Figure only one secondary separator is shown for clarity reasons. In a typical arrangement more than one, suitably two, secondary separators (12) are in fluid communication with the gas outlet conduit (11) of one primary cyclone (3). The secondary separator (12) shown in the Figure is a typical conventional cyclone separator as described in the afore mentioned general textbook having a tangentially arranged gas inlet and a gas outlet conduit (13) which protrudes the roof (14) of the tubular cyclone housing (15). Through this gas outlet conduit the hydrocarbon vapours which are poor in catalyst particles are discharged from the apparatus according the invention. The vapours are further processed in downstream product separation equipment (not shown). The secondary cyclone (12) is further provided with a dipleg (16) fluidly connected to tubular housing (15) to discharge separated catalyst particles downwards.

Preferably the gas inlet opening of the gas outlet conduit (11) of primary cyclone (3) is located at a distance (d1) above the centre of the tangentially arranged inlet opening (6), which is greater than any typical values for the state of the art cyclones having a protruding gas outlet conduit. More preferably the ratio of this distance (d1) and the diameter (d2) of the tubular housing (4) is between 0.2 and 3 and most preferably between 0.5 and 1.5. In the illustrated embodiment the gas inlet opening of the gas outlet conduit (11) is flush with the cyclone cover (9).

FIG. 1 without a riser (1) illustrates an apparatus according to the invention which can be used in other separation applications, for example is an FCC regenerator.

Preferably an FCC regenerator will be provided with a plurality of primary and secondary cyclones as illustrated in the upper part of the regenerator vessel. A short conduit will fluidly connect the interior of the regenerator vessel and the tangentially arranged inlet (6).

Figure 2:
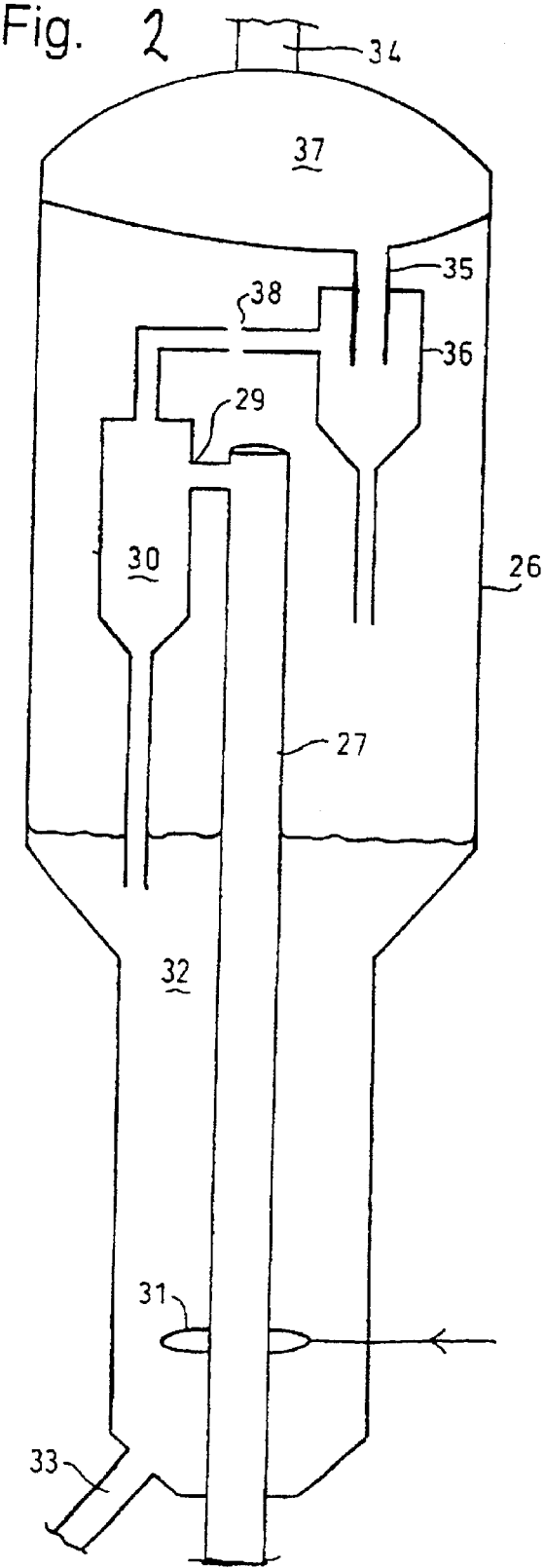
FIG. 2 illustrates an FCC reactor vessel comprising the apparatus according to the first preferred embodiment of the present invention.

FIG. 2 represents a preferred embodiment of the apparatus according to the invention. FIG. 2 illustrates a fluidized catalytic cracking (FCC) reactor vessel (26) comprising the upper part of a reactor riser (27), a primary cyclone (30) and a secondary cyclone (36). The downstream end of the reactor riser (27) is in fluid communication with the tangentially arranged inlet (29) of the primary cyclone (30). More than one primary cyclone (30) may be connected to the riser outlet and more than one secondary cyclone (36) may be connected to one primary cyclone (30). For clarity reasons only one primary cyclone (30) connected to one secondary cyclone (36) is shown.

The reactor vessel (26) further comprises at its lower end a stripping zone provided with means (31) to supply a stripping medium to a dense fluidized bed (32) of separated catalyst particles. Stripping medium can be any inert gas, steam or steam containing gasses are suitably used as stripping medium.

The reactor vessel (26) further comprises means to discharge stripped catalyst particles from the vessel via conduit (33). Via conduit (33) stripped, or also referred to as spent catalyst, is transported to a regeneration zone (not shown).

In such a regeneration zone coke is removed from the catalyst by means of (partial) combustion. Regenerated catalyst is transported to the upstream part of the reactor riser where it is contacted with a hydrocarbon feed to yield the earlier referred to suspension of catalyst particles and hydrocarbon product vapours at the down stream part of the reactor riser.

The reactor vessel (26) further comprises means to discharge the hydrocarbon and stripping medium vapours from the vessel via conduit (34). Typically the gas outlet conduit(s) (35) of the secondary cyclone(s) (36) are in fluid connection with a plenum (37) from which the hydrocarbon product vapours are discharged via conduit (34). In a preferred embodiment an opening (38) is present in the gas outlet conduit connecting the primary cyclone with the secondary cyclone (36). Through this opening stripping medium and hydrocarbons, which are stripped from the catalyst, can be discharged from the vessel (26).

Figure 3:
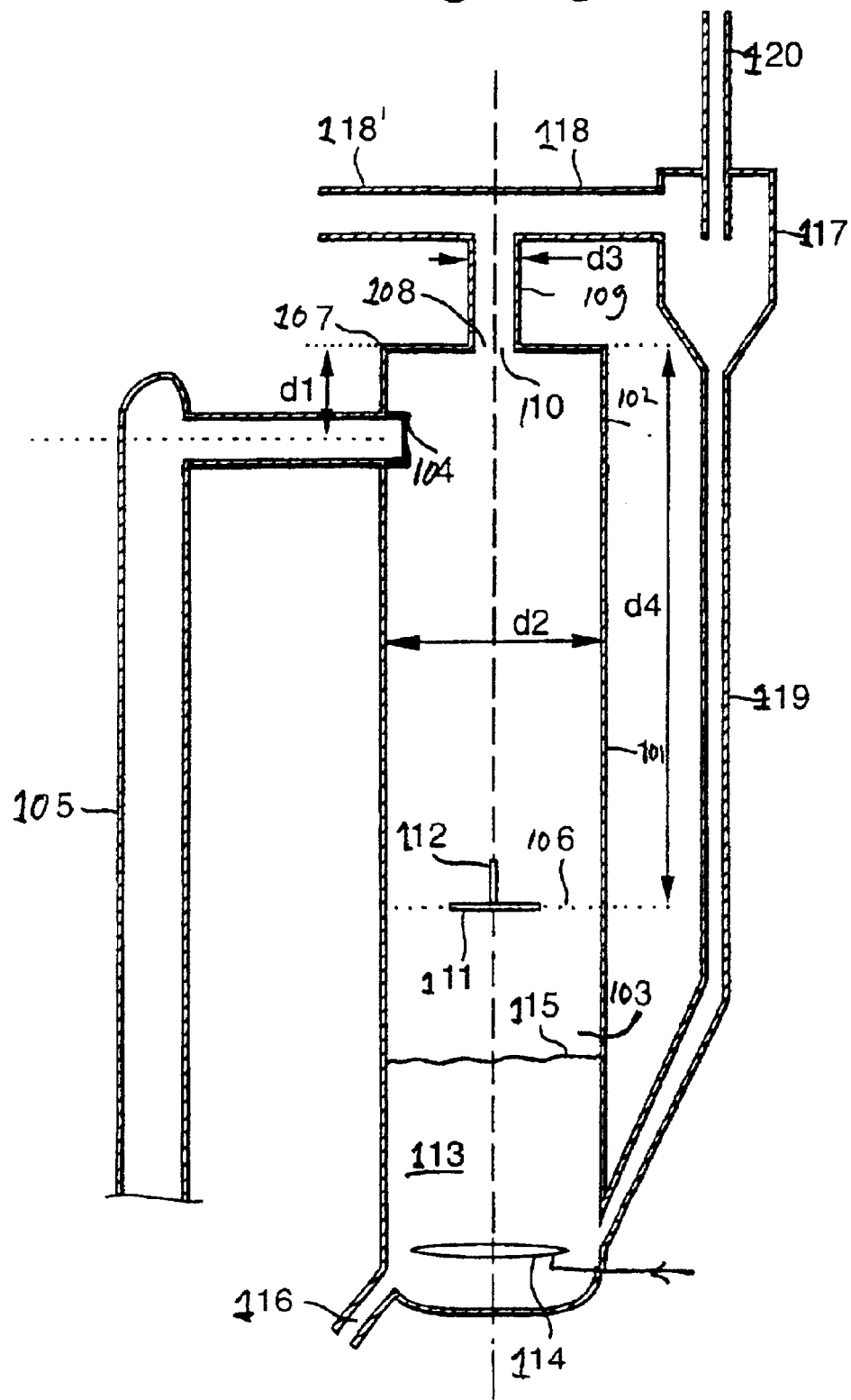
FIGS. 3–5 illustrate an apparatus according to the second preferred embodiment of the invention, wherein separation and stripping are combined in an FCC reactor.

In FIG. 3 a vertical arranged tubular vessel (101) is shown consisting of the primary cyclone (102) as the upper part and the stripping zone (103) as the lower part. The primary cyclone (102) has a tangentially arranged inlet (104) for receiving the suspension of catalysts and vapour. This inlet is in fluid communication with a downstream part of an externally positioned FCC reactor riser (105), allowing catalyst and vapour leaving the reactor riser (105) to enter the primary cyclone (102). The tubular housing of primary cyclone (102) has an opening (106) at its lower end and a cover (107) at its upper end. The cover (107) is provided with an opening (108). This opening (108) is fluidly connected with conduit (109) through which cleaned vapours can be discharged from the cyclone housing. The gas inlet opening (110) of conduit (109) is located at about the same level as the opening (108) in cover (107). It has been found to be advantageous that the inlet opening of conduit (109) is located at some distance (d1) above the centre of the tangentially arranged inlet opening (104). The ratio of this distance (d1) and the diameter of the tubular housing (d2) is as described above. It is even more preferred that the gas inlet (110) of conduit (109) is formed by the opening (108) in cover (107) as shown in FIG. 3. This is advantageous because the tubular cyclone housing will include less surface on which carbon deposits can accumulate. In the primary cyclone (102) the separation takes place between the major part of the catalysts and the gaseous hydrocarbons. The catalyst falls down via the open lower end (106) of the primary cyclone into a stripping zone (103).

The conduit connecting tangentially arranged inlet (104) and the riser (105) is preferably made at an angle of 90° with respect to the riser (105). However in order to eliminate accumulation of catalyst in this horizontal connecting conduit it is advantageous to direct this conduit downwards such that the gas-particles mixtures enters the primary cyclone in a downward direction. Preferably the angle between the axis of this conduit and the axis of the tubular housing (101) is between 89 and 75°. It has also been found to be advantageous to have a smaller cross sectional area at inlet (104) relative to the cross sectional area of the connecting conduit at a point nearer to the riser (105).

Preferably a vortex stabiliser (111) is provided at the interface between the primary cyclone (102) and the stripping zone (103). The vortex stabiliser (111) is suitably a circular flat plate or cone-shaped disk. The diameter of the vortex stabiliser suitably is greater than the diameter (d3) of the gas inlet opening (110) of the gas outlet conduit (109). The diameter of the vortex stabiliser (111) should be small enough to provide an annulus between the perimeter of the vortex stabiliser and the wall of the tubular housing, which annulus permits catalysts to flow downwards while simultaneously passing stripping gas in an upwards direction. Preferably the diameter of the vortex stabiliser (111) is between 40 and 85% of the diameter (d2) of the tubular vessel (101). The vortex stabiliser (111) is preferably positioned at a distance (d4) below the gas inlet opening (110) of gas outlet conduit (109), wherein (d4) is between 2 and 5 times the diameter (d2) of the tubular vessel (101).

The vortex stabiliser (111) is preferably provided further with a vortex finder (112). A vortex finder (112) is a vertical positioned rod having a length of about between 0.25 to 1 times the diameter (d3) of the gas inlet opening of the gas outlet conduit (109). A suitable vortex stabiliser (111) and vortex stabiliser rod (112) are for example described in the above mentioned U.S. Pat. No. 4,455,220. The vortex finder rod (112) may suitably be a hollow tube resulting in a fluid connection of the space above the vortex finder (111) and the space below the vortex finder (111). The hollow vortex finder rod will allow upwards moving gas to pass, thereby enhancing the stabilising effect on the vortex present in the primary cyclone (102).

In stripping zone (103) a fluidized bed (113) is present in which catalyst are stripped from the hydrocarbon deposits by supplying stripping gas via stripping gas supply means (114). Stripping gas is suitably steam. The stripping zone may suitably have more than one stripping gas supply means located at some distance above each other. The stripping zone includes a dense phase, in which the catalyst are kept in a dense fluidized bed mode by means of the stripping gas and a dilute phase located above the dense phase. The boundary between the two phases is formed by fluidized bed level (115). Through conduit (116) stripped catalyst are transported to a catalyst regenerator (not shown).

The stripper zone (103) may suitably contain internals to enhance the stripping efficiency. Preferably the height of the stripping bed, being the distance between the lowest positioned stripping gas supply means and the fluidized bed level (115) is at least 3 times the average diameter of the stripping zone (103). The superficial steam velocity in the fluidized bed is preferably between 0.05 and 1 m/s, and more preferably between 0.1 and 0.7 m/s. Preferably between 3 and 9 kg steam per ton circulating catalyst is supplied to the stripping zone (103).

The gas outlet conduit (109) is in fluid connection with one or more, preferably 2-4 secondary gas-solids cyclones (only one secondary cyclone shown in FIG. 3 as (117)) via conduit (118) and optionally one or more other conduits (118'). The catalyst which is removed from the vapours in the secondary cyclone will be transported to the stripping zone (103) via dipleg (119). The cleaned hydrocarbon vapours are discharged via conduit (120) for further processing.

In the apparatus shown in FIG. 3 all the stripping gas is discharged from the stripping zone (103) via the primary cyclone (102) to the gas outlet conduit (109) of the primary cyclone (102) because the primary cyclone (102) and stripping zone (103) together form one tubular vessel (101). Although this is a preferred embodiment of the invention, other embodiments can also be envisaged, wherein only part of the stripping gas is discharged via this opening (106) and wherein the advantages, namely an improved separation of solids and gas, are also achieved. Examples of such embodiments of the invention are illustrated by FIGS. 4 and 5.

Figure 4:
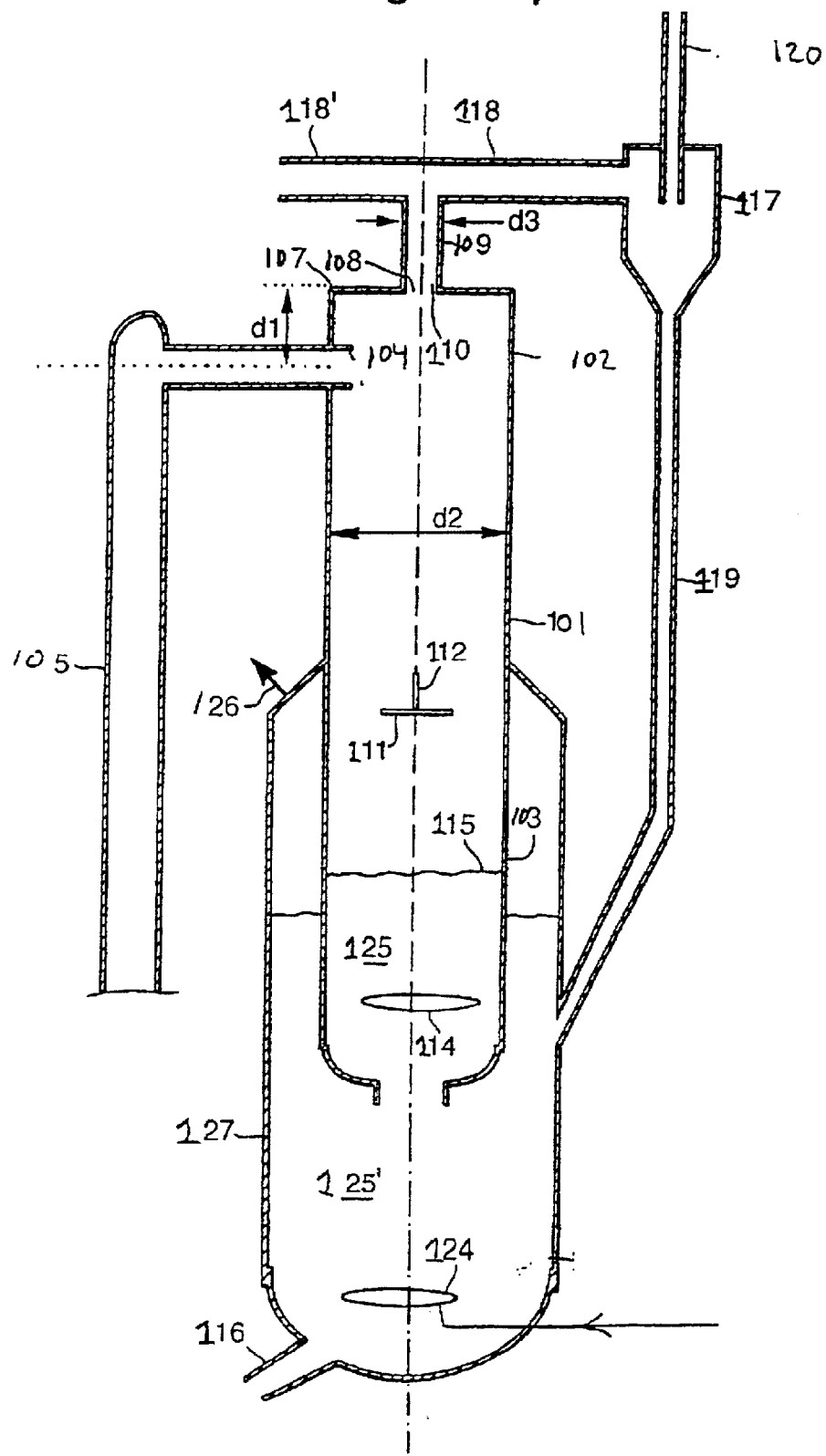

In FIG. 4 an embodiment is shown wherein the lower part of the tubular stripping zone (103) protrudes a larger tubular vessel (127) from above. The lower end of the tubular stripping zone (103) is in fluid communication with the interior of vessel (127). In vessel (127) additional means (124) for supplying stripping steam are present. At the top of vessel (127) a conduit (126) is present through which part of the stripping steam can be discharged. This conduit (126) is suitably in fluid communication with the downstream part of reactor riser (105) or with the gas outlet conduit (109) or (118). The larger tubular vessel provides, in use, a secondary stripping zone (125') next to the primary stripping zone (125). The dipleg of the secondary cyclone is preferably in fluid communication with the secondary stripping zone.

Figure 5:
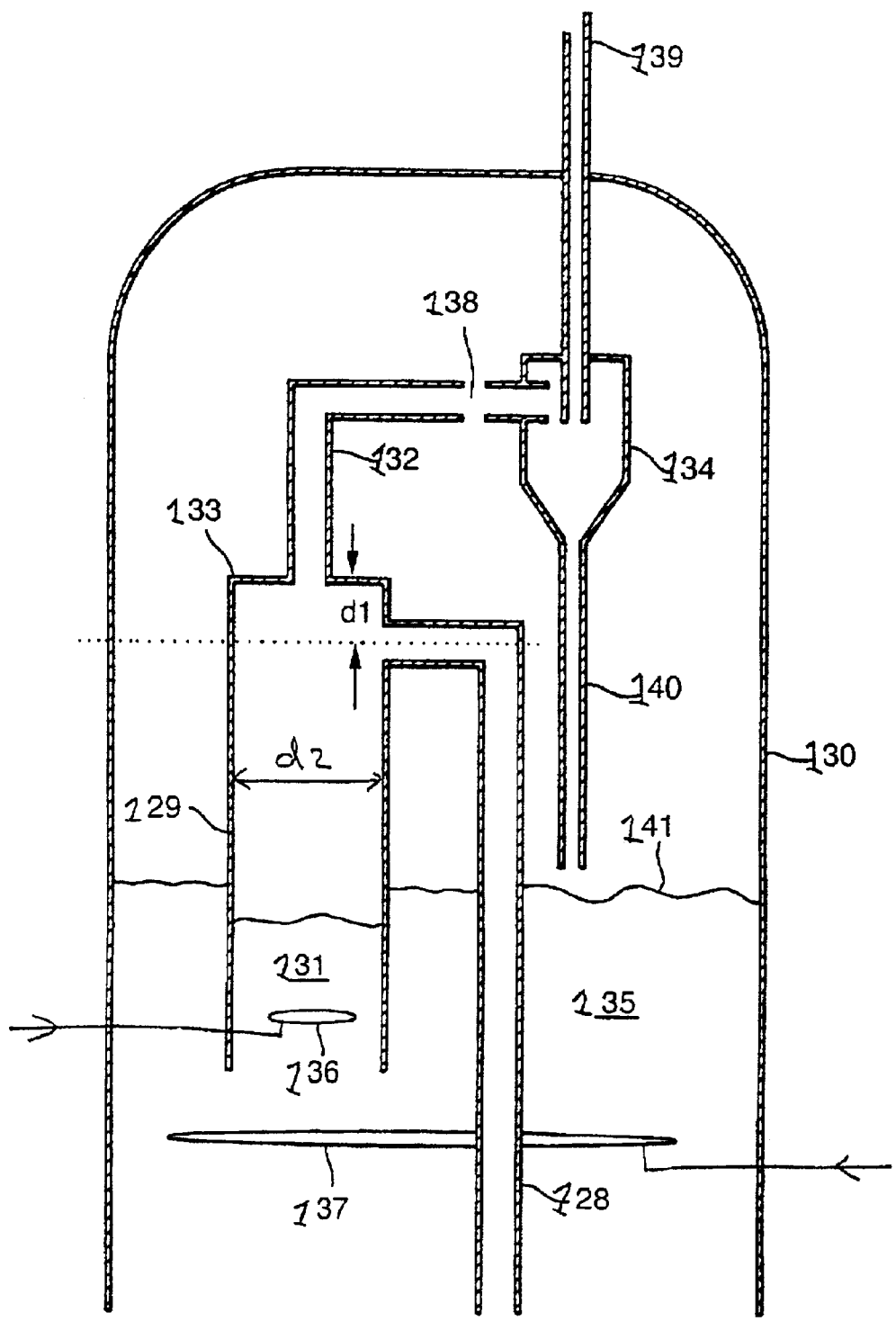

FIG. 5 illustrates an apparatus for the separation of catalyst particles from a gaseous stream wherein one or more primary cyclones, secondary cyclone(s) and the stripping zone are located in a reactor vessel having a larger diameter than the primary cyclone. The reactor vessel is furthermore provided with inlet and outlet means to supply the suspension of catalytic particles and vapour and means to discharge stripped catalyst and vapours essentially free of catalyst particles. The inlet means to supply the suspension of catalytic particles to the primary cyclone is in fluid connection with the downstream end of a reactor riser (128) of a fluid catalytic cracking (FCC) process. Such a downstream end of a reactor riser (128) may be positioned within (as shown) or outside the reactor vessel (130). The primary cyclone (129) is located in a reactor vessel (130), in which cyclone (129) the gas-solids stream enters tangentially into a vertical tubular cyclone housing. The solids are discharged to a primary stripping zone (131) located at the lower end of the reactor vessel (130). A partly cleaned gas stream and part of the stripping gas is discharged upwards through a vertical gas-outlet conduit (132), which gas-outlet conduit does not protrude the primary cyclone roof (133) from above. The solids still present in the partly cleaned gas obtained are subsequently separated in a second cyclone apparatus (134). As described earlier more than one primary cyclone and more than one secondary cyclone may be fluidly connected to the reactor riser. For clarity reasons these cyclones are not shown. The primary stripping zone (131) is formed by the open lower end of the tubular housing of the primary cyclone (129) projecting downwards to a point below the fluidized bed level (141) of a main fluidized-bed zone (135) present in the lower part of reactor vessel (130). Stripping gas is supplied to the primary and main fluidized bed zone by means (137) and optionally by means (136). Because the tubular housing of the primary cyclone (129) is smaller than the reactor vessel (130) only a part of the stripping gas will leave the reactor vessel (130) via conduit (132). The remaining part of the stripping gas will leave the vessel (130) via slit (138) present in the gas outlet conduit (132), secondary cyclone (134) and the secondary cyclone gas outlet (139). Catalyst separated in secondary cyclone (134) are returned to the main stripping zone (135) via dipleg (140). The primary cyclone (129) may additionally be equipped with a vortex stabiliser (111) and a tube (121) as shown in FIG. 3. The preferred ratio of d1 and d2 are as described above.

The embodiment of FIG. 5 can advantageously be obtained by a simple modification of the primary cyclone of an existing FCC reactor vessel. An example of such a known FCC reactor vessel is described in the WO-A-9742275.

Examples of FCC processes in which the apparatus according the invention can be suitably used are described in the afore mentioned patent publications and those described in Catalytic Cracking of Heavy Petroleum Fractions, Daniel DeCroocq, Institut Frangais du Petrole, 1984 (ISBN 2-7108-455-7), pages 100–114. Preferably the apparatus is used in an FCC process wherein a gas solids suspension if fed to the primary cyclone having a solids content of between 0.5 and 15 and more preferably between 1 and 12 kg/m3.

The invention shall be illustrated by the following non-limiting examples.

EXAMPLE 1

To a separation apparatus as described in FIG. 1 a gas-solids suspension was fed having the properties as listed in Table 1. The dimensions of the primary cyclone were so chosen that d1 was 0.3 m and d2 was 0.3 m.

TABLE 1

| | |
|---|---|
| average particle size (micron) | 76 |
| density of suspension (kg/m3) | 5.8 |
| primary cyclone inlet velocity (m/s) | 10 |
| separation in-efficiency of the primary cyclone | 0.04% |
| separation in-efficiency of the combined primary and secondary cyclones | 0.4 ppm |
| pressure-drop (Pascal) | 2500 |

Comparative Experiment A

Example 1 was repeated except that the primary cyclone was one of a state of the art design having a gas outlet conduit which protrudes downwardly through the roof of the cyclone housing. The bottom of the tangentially gas inlet and the opening of the gas outlet conduit were in the same horizontal plane. The top of the tangentially inlet and the roof of the cyclone housing in the same horizontal plane. The distance between the centre of the tangentially inlet and the frusto conical wall section was the same as in Example 1. Furthermore the inlet velocity, the composition of the suspension and the dimensions of the secondary cyclone were the same. The results are presented in Table 2.

TABLE 2

| | |
|---|---|
| Average particle size (micron) | 76 |
| density of suspension (kg/m3) | 5.8 |
| primary cyclone inlet velocity (m/s) | 10 |
| separation in-efficiency of the primary cyclone | 0.9% |
| separation in-efficiency of the combined primary and secondary cyclones | 3 ppm |
| pressure-drop (Pascal) | 2200 |

Comparative Experiment B

Experiment A was repeated except that the primary cyclone was the same state of the art design however improved in efficiency by narrowing the inlet-ducting of the primary cyclone. All other dimensions and operational data were kept the same. The results are presented below in Table 3.

TABLE 3

| | |
|---|---|
| Average particle size (micron) | 76 |
| density of suspension (kg/m3) | 5.8 |
| primary cyclone inlet velocity (m/s) | 20 |
| separation in-efficiency of the primary cyclone | 0.01% |
| separation in-efficiency of the combined primary and secondary cyclones | 1 ppm |
| pressure-drop (Pascal) | 3500 |

By comparing the results from Example 1 with Experiment A and Experiment B with A it is apparent that in both situations the separation efficiency is enhanced of the primary cyclone. Furthermore the combined separation in-efficiency of the primary cyclone and the secondary cyclone of Experiment B is reduced by a factor 3 as compared to Experiment A at a considerable penalty in increase in pressure drop. With the apparatus according the invention, as illustrated in Example 1, the combined separation in-efficiency is reduced almost ten-fold at a much lower increase in pressure drop when compared to Experiment A.

EXAMPLE 2

Example 1 was repeated except that the primary cyclone did not have a dipleg at its lower end. Instead the lower end of the tubular housing consisted of a fluidized bed as illustrated in FIG. 3. The fluidized bed level was kept below the vortex stabiliser. The particles of the fluidized bed are the same as the solids supplied to the primary cyclone. To this fluidized bed air was supplied as fluidizing gas. All of the air supplied to the fluidized bed zone was discharged from the primary cyclone via the gas outlet opening of the primary cyclone. Distances d1 and d2 were as in Example 1. More conditions and results are presented below in Table 4.

Comparative Experiment C

Example 2 was repeated except that the gas outlet conduit protrudes downwardly through the roof of the cyclone housing such that the bottom of the tangentially gas inlet and the opening of the gas outlet conduit were in the same horizontal plane and wherein the top of the tangentially inlet and the roof of the cyclone housing in the same horizontal plane. The distance between vortex stabiliser and gas inlet was as in Example 2. The fluidized bed level was kept below the vortex stabiliser as in Example 2. More conditions and results are presented below in Table 4.

TABLE 4

| | Example 2 | Comparative Experiment C |
|---|---|---|
| Average particle size (micron) | 76 | 76 |
| density of suspension (kg/m3) | 4 | 4 |
| primary cyclone inlet velocity (m/s) | 20 | 20 |
| upwardly superficial gas velocity in primary cyclone (m/s) | 0.3 | 0.3 |
| separation in-efficiency of the primary cyclone | 0.02% | 0.2% |
| separation in-efficiency of the combined primary and secondary cyclones | 0.5 ppm | 3 ppm |
| pressure-drop (Pascal) | 3300 | 3500 |

When increasing the superficial gas velocity to values above the 0.3 m/s as illustrated in Example 2 and Comparative Experiment C it is observed that at about 0.4 m/s the apparatus of Experiment C showed a sudden strong decrease in separation efficiency. This sudden strong decrease in separation efficiency was only observed at a substantial higher superficial gas velocity with the apparatus of Example 2.

What is claimed is:

1. An apparatus comprising:
   (i) a vertical primary cyclone vessel having a tubular housing comprising a tubular wall section provided with a tangentially arranged inlet that is fluidly connected to a reactor riser of a fluidized catalytic cracking process and which provides for receiving a suspension of catalyst particles and hydrocarbon vapor from said reactor riser, and which tubular wall section is open at its lower end and closed at its upper end by means of a cover provided with an opening, wherein the opening is fluidly connected to a gas outlet conduit, which conduit has a gas inlet opening located at the same level as the opening in the cover;
   (ii) one or more secondary gas-solids separator means which are fluidly connected with the gas outlet conduit of the primary cyclone; wherein the gas inlet opening of the gas outlet conduit is located at a distance (d1) above the center of the tangentially arranged inlet opening and wherein the ratio of this distance and the diameter of the tubular housing (d2) is between about 0.2 and 3.

2. The apparatus of claim 1, wherein the secondary gas-solid separator means is a cyclone separator.

3. The apparatus of claim 1, wherein a stripping zone provided with means to supply stripping gas is present, so arranged that in use a fluidized bed is present, located such that part or all of the stripping gas leaving the stripping zone in an upward direction enters the lower end of the primary cyclone.

4. The apparatus of claim 3, wherein a vortex stabilizer is provided at the interface between the primary cyclone and the stripping zone.

5. The apparatus of claim 3, wherein the primary cyclone vessel and the stripping zone together form one tubular vessel, wherein in use, all of the stripping gas will be discharged from the stripping zone via the primary cyclone to the gas outlet conduit of the primary cyclone.

6. The apparatus of claim 3, wherein the primary cyclone, secondary cyclone(s) and the stripping zone are located in a reactor vessel having a larger diameter than the primary cyclone, wherein said reactor vessel is also provided with means to supply the suspension of catalytic particles and vapor and means to discharge stripped catalyst and vapors essentially free of catalyst particles.

7. The apparatus of claim 1, wherein a dipleg is present at the lower end of the tubular wall section of the primary cyclone, said dipleg is fluidly connected to the tubular wall section by means of a frusto conical wall section.

8. The fluidized catalytic cracking reactor vessel comprising an apparatus according to claim 7, wherein a downstream end of a reactor riser is in fluid communication with the tangentially arranged inlet of the primary cyclone, the vessel further comprising at its lower end a stripping zone provided with means to supply a stripping medium to a dense fluidized bed of separated catalyst particles, means to discharge stripped catalyst particles from the vessel and means to discharge the hydrocarbon and stripping medium vapors from the vessel.

9. The vessel of claim 8, wherein the gas outlet conduit of the primary cyclone is provided with an opening to receive stripping medium and stripped hydrocarbons.

10. The use of an apparatus of claim 1 to separate solid particles from a suspension of particles and gas.

11. The use of claim 10, wherein the separation is part of a fluid catalytic cracking process.

12. The use of claim 11, wherein a gas solids suspension if fed to the primary cyclone having a solids content between about 0.5 and 15 kg/m$^3$.

* * * * *